Patented Oct. 7, 1947

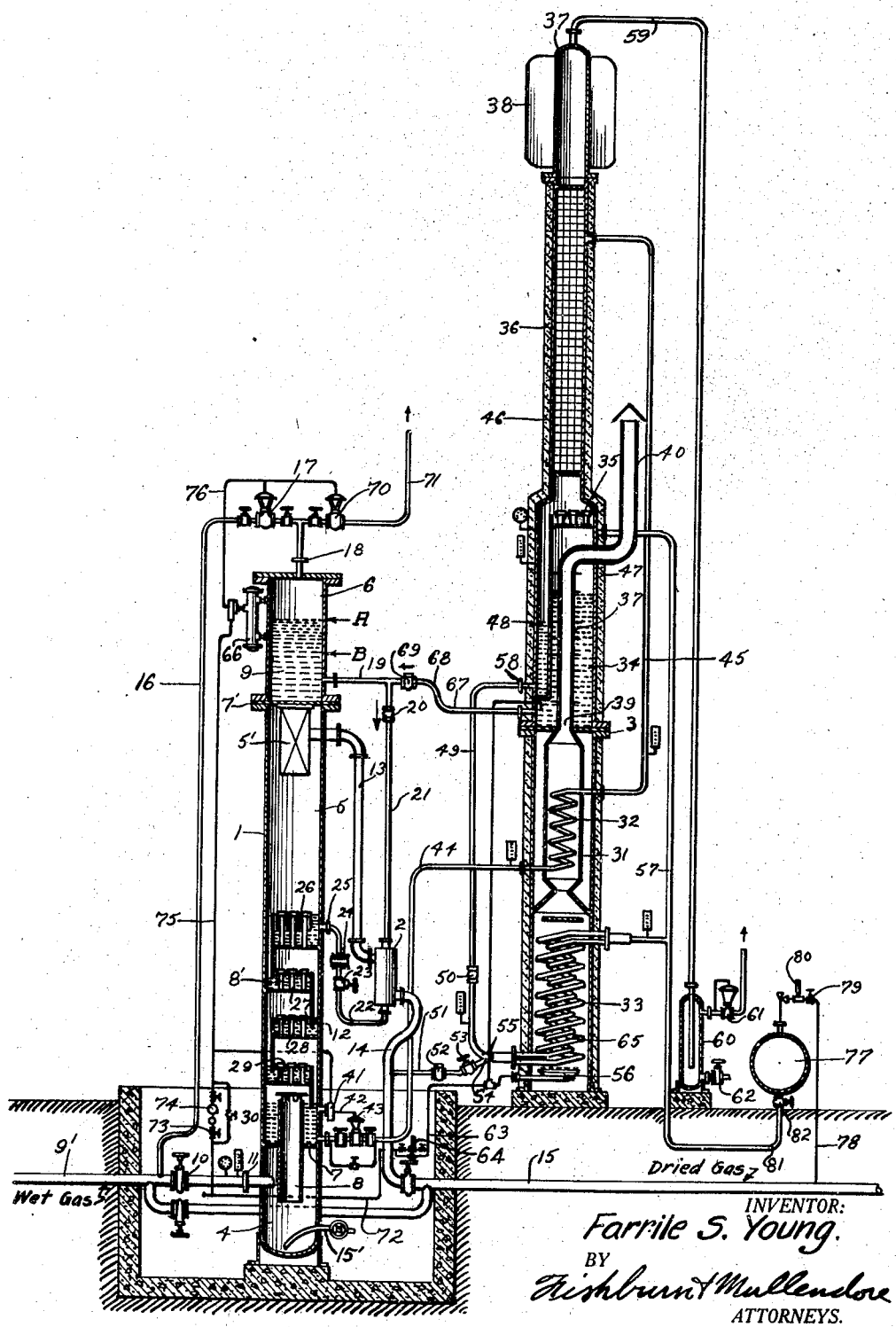

2,428,643

UNITED STATES PATENT OFFICE 2,428,643

METHOD AND APPARATUS FOR TREATING GAS

Farrile S. Young, Kansas City, Mo., assignor to Panhandle Eastern Pipe Line Company, Kansas City, Mo., a corporation of Delaware Application July 15, 1944, Serial No. 545,034

7 Claims. (Cl. 183—120)

This invention relates to a method and apparatus for treating gas, and more particularly to a method and apparatus for separating moisture or other impurities, or desirable components, from natural gas at individual wells, a group of wells, or at desired locations along a pipe or gas transportation line.

It is well known that field line pressures of 500 pounds to 600 pounds cause hydrate formations or "freezes" at temperatures of 52° F. to 55° F. When the gas from wells enters a line saturated with water at temperatures varying from 60° F. to 70° F., and is cooled by the ground temperature considerable moisture is precipitated in the pipe lines, and in addition to this cooling causes freezes in lines which are a constant source of trouble during the period when maximum efficiency is most needed. To prevent freeze-ups it is necessary to remove this moisture content.

It is the practice to dehydrate gas by contacting the gas under high pressure with an absorbing liquid, and then reconcentrating the liquid in a still operating at much lower pressures. Otherwise, the concentration must be carried on at line pressure.

Apparatus heretofore in use for separating the moisture from the gas at wells has required either pumping equipment or a boiler operating at line pressure. In the first instance the use of pumping equipment requires power for operating the pumps and full supervision. In the second instance the use of high pressures in the boiler imparts undesirable characteristics to the evaporation process in addition to requiring an expensive high pressure vessel for the boiler unit.

Therefore, the objects of the present invention are to provide a method and apparatus for transferring the absorbing liquid from a reconcentrating apparatus operating at low pressure to the absorbing apparatus operating at high pressure; to provide a method and apparatus of this character that is simple, efficient and economical to install; to provide for automatic operation of the transfer apparatus requiring no power other than that obtained from the gas; to provide a method and apparatus capable of operating for considerable periods of time with a relatively small amount of attention; to provide a method and apparatus having few moving parts, thus eliminating frequent adjustment; to provide a method and apparatus whereby only occasional replacement of a small quantity of the absorbing liquid is required; to provide a method and apparatus for maintaining the desired temperature required for controlling the concentration of the absorption liquid; to provide a method and apparatus for appreciably depressing the dew point so that small quantities of untreated gas can be mixed without raising the dew point of the mixed gas above the minimum ground temperature; and to provide a method and apparatus for the treatment of gases wherein the gas to be conditioned is contacted with an absorbing solution for denuding said gas of water or other impurities contained therein as it flows from a well.

In accordance with the present method the gas is first brought into the bottom of a contacting unit at line pressure and is subjected to a whirling action to remove entrained moisture. The gas is then brought into intimate contact with a suitable dehydrating agent such as glycol or some other hygroscopic or absorbing liquid. The cleaned and dehydrated gas then passes through a mist extractor for the removal of entrained liquid and then through a heat exchanger where it is used to cool the incoming glycol before discharging into the main line.

Concentrated glycol enters the contacting unit from a reservoir located above the gas outlet and flows by gravity downward through a heat exchanger where it is cooled by the dehydrated gas. The rate of flow of this glycol is controlled either manually by a valve located in the line just before it reaches an orifice flow meter or it may be controlled automatically by a control valve connected to a density controller which continuously draws samples from the bottom tray in the contacting unit. A pressure slightly greater than that existing in the contacting unit is maintained in the glycol reservoir by a pressure line from the incoming gas main. This is an aid in maintaining a uniform flow of glycol. The glycol enters the top tray of the contacting unit and overflows onto successively lower trays, or it may be sprayed into the gas stream and be collected in a reservoir near the bottom of the contactor. In contacting the wet gas the glycol absorbs water and must be reconcentrated.

The dilute glycol is discharged through a continuous drainer from a reservoir near the base of the contacting unit to a reconcentrating still, as later described. Here the accumulated moisture is boiled off and discharged as steam, and the concentrated absorbing liquid collects in a reservoir at the bottom of the still.

As the level of the glycol in the reservoir on top of the contacting unit is lowered, the pressure line valve closes and a second valve opens the reservoir to atmosphere. The concentrated glycol then flows by gravity from the reservoir below the still to the reservoir in the contacting unit. This operation is automatic. It is, therefore, essential to this invention that the proper relative elevation between the reservoir below the still and the reservoir in the contacting unit be maintained. That is, the liquid level in the still reservoir is of such elevation that the liquid will flow back to the glycol reservoir under the pressures carried in the respective reservoirs; otherwise, the still must operate under pressure.

In the accompanying drawing I have shown for purposes of illustration only a preferred embodiment of the present invention, this drawing being somewhat diagrammatic and in vertical section, all of the parts being shown in a single plane.

Referring more in detail to the drawings:

1 designates a contacting unit, 2 a heat exchanger and 3 a reconcentrating boiler.

The contacting unit is separated into three compartments 4, 5 and 6, by plates 7 and 7'. Leading from the lower compartment to the central compartment is a chimney 8. The central compartment 5 is provided with a mist extractor 5', and located within said compartment is a series of trays 8', of bubble or other suitable type. The upper compartment of the contacting unit provides a reservoir 9 for containing glycol or other hydroscopic agent.

Wet or moist gas enters the chamber 4 of the contacting unit through pipe 9', valve 10 and inlet connection 11. The gas entering the chamber 4 of the contacting unit is subjected to a whirling action to eliminate entrained moisture and then passes upwardly through chimney 8 through the series of bubble trays or contacting zones 8' in the tower 12 of the contacting unit. The gas continues upwardly through the mist extractor 5' through an outlet pipe 13 extending through the side of the tower 12 and passes through the heat exchanger 2 where the cleaned and dehydrated gas is used to cool the incoming glycol or other absorbing agent. The gas is then discharged from the heat exchanger through line 14 to the main line 15 for transportation to the point of use. Water from the wet gas collecting in the bottom of chamber 4 may be discharged therefrom through pipe 15'.

Concentrated glycol is stored in the glycol reservoir 9 which is subject to line pressure through pipe 16, valve 17 and inlet 18 to the top of the reservoir. The glycol flows by gravity through pipe 19, check valve 20 and pipe 21 to the heat exchanger 2 where it is cooled by the discharged gas.

The glycol then passes from the lower side of the heat exchanger 2 through pipe 22, regulating valve 23 and orifice flow meter 24 through inlet 25 to the contacting zone or bubble tray 26 in the tower 12. The glycol in the tower 12 then flows by gravity to the successively lower trays 27, 28 and 29 to reservoir 30 above the chamber 4 in the contacting unit. During the travel of the glycol, as just above described, it will absorb moisture from the gas, and, therefore, requires reconcentration.

The reconcentrating boiler 3 is provided with a pre-heater 31, containing a heating coil 32, a reboiler 33, an evaporator reservoir 34 having a tray 35 preferably of bubble type, a saddle packed still tower 36 located above said reservoir and a cooling dome 37 having longitudinal fins 38 extending the full length of said dome.

The pre-heater is provided with a flue 39 which extends upwardly through the reservoir 34 and is provided with fins 37 on each side thereof of that part of the flue contained within the reservoir 34. The flue 39 extends through the side of the evaporator reservoir 34 providing a flue 40 to atmosphere. Located on the side of the reservoir 30 of the contacting unit is a drainer 41. Leading from the drainer is a pipe 42 provided with a pressure reducing valve 43 and a pipe 44 leading to the pre-heater coil 32.

A drainer 41 is attached to the side of the reservoir 30. A pipe 42 connects the drainer to a level actuated valve 43.

Flow of the dilute glycol solution contained in the reservoir 30 is regulated by the drainer 41 acting on the level actuated valve 43 and is discharged from the reservoir through pipe 44 to the pre-heater coil 32 where it is heated and passed through a pipe 45 to the saddle packed still tower 36 where a portion of the moisture contained in said solution is discharged. The saddle packed still tower 36 and evaporator reservoir 34 may be insulated preferably with magnesium insulation as indicated at 46 and 47. When the glycol reaches the saddle packed still tower it is in partly concentrated solution and passes through the packing to the bubble tray 35 and overflows into a well 48 of the evaporator reservoir.

The concentrated solution then passes from the well 48 through pipe 49, check valve 50 to the reboiler 33. If desired, a small quantity of stripping gas may be added to the concentrated solution entering the reboiler to increase the efficiency of the boiling operation. This gas may be drawn from the dry gas line 14 through line 51, check valve 52, needle valve 53, line 54, to connect with the pipe 49 as indicated at 55.

The glycol solution is heated in the reboiler by a burner 56, located beneath said reboiler, to a temperature of approximately 325° F. The glycol from the reboiler then flows by thermal action through pipe 57 to the evaporator reservoir 34 located midway of the boiler tower, as previously described. By this operation any remaining moisture in the glycol solution, together with the stripping gas added before entering the reboiler is expelled. The temperature in the reservoir 34 is controlled by a thermostat 58 which controls actuation of the burner 56.

Any moisture in the form of vapor passes from the reservoir 34 through the tray 35, saddle packing 36, finned cooling dome 37 and out of the tower through pipe 59 leading to a trap 60 provided with a regulating valve 61. The regulating valve 61 may be used to maintain any desired pressure on the still necessary to insure the flow of glycol from the still reservoir to the contacting unit, as later described. Any condensate collecting in the trap 60 may be drawn off through a valve 62 located near the bottom of said trap. A pipe 63 is connected to the dry gas line 14 for supplying gas to the burner 56. The pipe 63 is provided with a regulator 64 controlling the pressure of gas to said burner.

The reboiler is provided with a heating coil 65. After heating the reboiler coil and the preheater coil the hot gases pass through the flue 39 to heat the glycol solution in the evaporator reservoir 34. The gases then are vented to atmosphere through vent pipe 40. Located on the side of the glycol reservoir 6 and near the top thereof is a liquid level controller 66 for operation of the valve 17 in the line 16 upon change of level of liquid in the reservoir 6.

It will be noted that the bottom of the reservoir 34 is located slightly lower than the bottom of the glycol reservoir 6. A pipe 67 is connected to the reservoir 34 at substantially the bottom thereof. The pipe 67 turns upwardly by an S-curve 68 and is provided with a check valve 69 connected to pipe 19 leading to the glycol reservoir 6.

As the level of the glycol in the reservoir 6 lowers from point A to point B, the liquid level controller 66 operates to close the valve 17 and then opens the valve 70 above the reservoir 6 to atmosphere through a pipe 71. This action relieves pressure on the reservoir 6 and the glycol contained in the reservoir 34 then flows by gravity therefrom through pipe 67, check valve 66 and pipe 19 to reservoir 6. As the level of the glycol rises from point B to point A, the valve 70 closes and then valve 17 opens. It will thus be seen that the liquid in the reservoir 5 is under pressure while the valve 17 is open, while in the reconcentrating boiler or tower it flows under gravity at such time as the valve 17 is closed and valve 70 is open. When pressure is on the reservoir 6 the glycol will be forced through pipe 19, check valve 20 and line 21 to the heat exchanger, thence to the tray 26 in the tower 12.

It will thus be seen that an important feature of applicant's invention is in the U-shaped arrangement and location of the reservoir 34 in the reconcentrating tower and the reservoir 6 in the contacting unit.

Gas for operating valves 17 and 70 is drawn from the dry gas line 14 through line 72, valve 73, pressure regulator 74 and pipe 75 to the liquid level controller 66 which controller, in turn, operates valves 17 and 70 through the pipe 76.

Additional storage of glycol or other hygroscopic agent is maintained in the storage tank 77. Pressure is maintained on the storage tank 77 by gas from the main gas line 15 through pipe 78, valve 79 and pressure regulator 80. Glycol may be added to the reservoir 34 from the reservoir 77 through line 81 connected to the lower side of the reservoir 77 by manual operation of the valve 82.

While I have described my method and apparatus as relating to dehydration of gas, it will be apparent that it can be applied to other dehydrating and gas treating operations, such as removal of undesirable impurities or desirable components of the gas. The apparatus is not limited to any particular gas pressure, but the gas pressure usually is much greater than the atmospheric pressure.

It will be apparent to those skilled in the art that the method and apparatus specified possess many advantages over the prior art and that the apparatus will continue to operate for long periods of time without servicing and without utilizing any power other than that derived from the gas itself.

What I claim and desire to secure by Letters Patent is:

1. The method of treating gas comprising, transferring an absorbing liquid from a low pressure rectifying zone to high pressure gas contacting zones including, confining a body of the absorbing liquid under pressure to cause the liquid to flow to the gas contacting zones for mixture with the gas, conveying the diluted liquid from the contacting zones to the rectifying zone, reconcentrating the liquid in the rectifying zone, and reducing the pressure on the confined absorbing liquid to permit flow of the reconcentrated liquid from the rectifying zone to reestablish supply of the absorbing liquid.

2. The method of treating gas comprising, transferring an absorbing liquid from a low pressure rectifying zone to high pressure gas contacting zones including, confining a body of the absorbing liquid under pressure at a level higher than the contacting zones to cause the liquid to flow to the gas contacting zones for mixture with the gas, conveying the diluted liquid from the contacting zones to the rectifying zone, reconcentrating the liquid in the rectifying zone and confining the same at a level higher than the confined body of absorbing liquid, and reducing the pressure on the confined absorbing liquid to permit flow of the reconcentrated liquid from the rectifying zone to reestablish supply of the absorbing liquid.

3. The method of treating gas comprising, transferring an absorbing liquid from a low pressure rectifying zone to high pressure gas contacting zones including, confining a body of the absorbing liquid under pressure at a level higher than the contacting zones to cause the liquid to flow to the gas contacting zones for mixture with the gas, conveying the diluted liquid from the contacting zones to the rectifying zone, reconcentrating the liquid in the rectifying zone, and reducing the pressure on the confined absorbing liquid to an amount below that formed by the pressure and head of the reconcentrated liquid in the rectifying zone to permit flow of the reconcentrated liquid from the rectifying zone to reestablish supply of the absorbing liquid at the level higher than the contacting zones.

4. Apparatus for removing moisture from wet gas by contact with an absorbing liquid comprising, a contacting unit including a chamber for contacting the gas with said absorbing liquid, a storage reservoir for the absorbing liquid, means for supplying the wet gas to the contacting chamber, means for applying pressure to the absorbing liquid in the reservoir, means for delivering the absorbing liquid to the contacting chamber for mixture with the incoming gas to remove moisture therefrom, a reconcentrating still, means for delivering the diluted absorbing liquid from the contacting chamber to the reconcentrating still, a level actuated valve connected to the contacting chamber for regulating flow of the absorbing liquid to said reconcentrating still, means in said reconcentrating still for heating said diluted liquid to change the density thereof, said still including a reservoir for the reconcentrated liquid, means for delivering the reconcentrated liquid to said reservoir, a line leading from said last named reservoir to the absorbing liquid reservoir in the concentrating unit, and means for reducing pressure on the absorbing liquid in the storage reservoir whereby the reconcentrated absorbing liquid will flow from the reservoir in the reconcentrating still to the storage reservoir.

5. Apparatus for removing moisture from wet gas by contacting an absorbing liquid comprising, a contacting chamber, means for flowing wet gas substantially at line pressure through the contacting chamber, a storage reservoir for the absorbing liquid supported at a higher elevation than said contacting chamber, means forming a passage from the storage reservoir to the contacting chamber, a check valve in the passage, means for preventing flow therethrough from the chamber to the storage reservoir, a reconcentrating still for removing moisture from the absorbing liquid at low pressure, a duct leading from the contacting chamber to the reconcentrating still, a valve operative responsive to the liquid level in the contacting chamber for regulating flow of the absorbing liquid through the duct to said reconcentrating still, a reconcentrated liquid reservoir located at a level higher than the absorbing liquid storage reservoir, means for delivering the reconcentrated liquid from the still to said reconcentrated liquid reservoir, a line leading from said last named reservoir to the storage reservoir, a check valve preventing flow of liquid from the storage reservoir to the reconcentrated liquid reservoir, and means actuated by lowering level of the absorbing liquid in the storage reservoir to reduce pressure therein whereby the head and pressure in the reconcentrated liquid reservoir effects flow of the reconcentrated liquid to the storage reservoir.

6. Apparatus for removing moisture from wet gas by contacting an absorbing liquid comprising, a contacting camber, means for flowing wet gas substantially at line pressure through the contacting chamber, a storage reservoir for the absorbing liquid supported at a higher elevation than said contacting chamber, means forming a passage from the storage reservoir to the contacting chamber, means for applying pressure to the absorbing liquid in the reservoir to effect flow through the line to the contacting chamber in counterflow relation to the gas in said chamber, a check valve in the passage, means for preventing flow therethrough from the chamber to the storage reservoir, a reconcentrating still for removing moisture from the absorbing liquid at low pressure, a duct leading from the contacting chamber to the reconcentrating still, a valve operative responsive to the liquid level in the contacting chamber for regulating flow of the absorbing liquid through the duct to said reconcentrating still, a reconcentrated liquid reservoir located at a level higher than the absorbing liquid storage reservoir, means for delivering the reconcentrated liquid from the still to said reconcentrated liquid reservoir, a line leading from said last named reservoir to the storage reservoir, a check valve preventing flow of liquid from the storage reservoir to the reconcentrated liquid reservoir, and means actuated by lowering level of the absorbing liquid in the storage reservoir to reduce pressure therein whereby the head and pressure in the reconcentrated liquid reservoir effects flow of the reconcentrated liquid to the storage reservoir.

7. Apparatus for removing moisture from wet gas by contact with an absorbing liquid comprising, a contacting unit including a chamber, means for flowing the wet gas substantially at line pressure through the contacting chamber, a storage reservoir for the absorbing liquid supported at a higher elevation than said contacting chamber, means responsive to change of level of liquid in the storage reservoir to cause the absorbing liquid to flow to the contacting chamber for removing moisture therefrom, means for applying pressure to the absorbing liquid in the reservoir to effect flow to and through the contacting chamber, a reconcentrating still for removing moisture from the absorbing liquid at low pressure, means for delivering the diluted absorbing liquid from the contacting chamber to the reconcentrating still, said still including a reservoir located at a level higher than the absorbing liquid reservoir for collecting the reconcentrated liquid, means for delivering the reconcentrated liquid to said reservoir, a line leading from said last named reservoir to the storage reservoir, and means for reducing pressure on the absorbing liquid in the storage reservoir to a point where the head and pressure in the reconcentrated liquid reservoir effects flow of the reconcentrated liquid to the storage reservoir.

FARRILE S. YOUNG.

REFERENCES CITED

The following references are of record in the file of this patent:

UNITED STATES PATENTS

| Number | Name | Date |
|---|---|---|
| 2,266,959 | Croft | Dec. 23, 1941 |
| 2,225,959 | Miller | Dec. 24, 1940 |
| 1,708,471 | Farnsworth | Apr. 9, 1929 |

OTHER REFERENCES

Wade, Natural Gas Pipe Line Dehydration. The Petroleum Engineer, March 1943, pages 184, 186, 188 and 190. (Copy in 183–120.5.)

Anderson, Dehydration Units for Individual Gas Wells. The Oil Weekly, May 5, 1941, pages 17, 18, 19.